US008452756B2

(12) United States Patent
Anderson et al.

(10) Patent No.: US 8,452,756 B2
(45) Date of Patent: May 28, 2013

(54) DATABASE EXECUTION DETAIL REPOSITORY

(75) Inventors: Mark John Anderson, Oronoco, MN (US); Robert Joseph Bestgen, Rochester, MN (US); Daniel E. Beuch, Rochester, MN (US); Curtis Neal Boger, Oronoco, MN (US); James Michael Flanagan, Rochester, MN (US); Scott Forstie, Rochester, MN (US); Shantan Kethireddy, Rochester, MN (US); Thomas Owen McKinley, Rochester, MN (US); Michael Donald Pfeifer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1588 days.

(21) Appl. No.: 11/558,104

(22) Filed: Nov. 9, 2006

(65) Prior Publication Data
US 2008/0114718 A1   May 15, 2008

(51) Int. Cl.
*G06F 17/30*   (2006.01)
*G06F 15/16*   (2006.01)

(52) U.S. Cl.
USPC ........................................ 707/719; 707/721

(58) Field of Classification Search
USPC ............................. 707/721, 719, 718
See application file for complete search history.

(56) References Cited

U.S. PATENT DOCUMENTS

| | | | | |
|---|---|---|---|---|
| 6,931,389 | B1* | 8/2005 | Bleizeffer et al. ................ | 1/1 |
| 2003/0221187 | A1* | 11/2003 | Barsness et al. .............. | 717/129 |
| 2004/0039729 | A1* | 2/2004 | Boger et al. ...................... | 707/2 |
| 2004/0158551 | A1* | 8/2004 | Santosuosso .................... | 707/2 |
| 2004/0205053 | A1* | 10/2004 | Bird et al. ........................ | 707/3 |
| 2004/0205062 | A1* | 10/2004 | Brown et al. .................... | 707/3 |
| 2004/0243607 | A1* | 12/2004 | Tummalapalli ............... | 707/100 |
| 2005/0114303 | A1* | 5/2005 | Barsness et al. ................ | 707/3 |

FOREIGN PATENT DOCUMENTS

| | | |
|---|---|---|
| CN | 1609790 | 4/2005 |
| CN | 1708757 | 12/2005 |

OTHER PUBLICATIONS

"The execution plan in Query Analyzer", web page at http://www.cachemonitor.de/feature-tour/the-execution-plan-in-query-analyzer.

* cited by examiner

*Primary Examiner* — Alex Gofman
(74) *Attorney, Agent, or Firm* — Martin & Associates, LLC; Derek P. Martin

(57) ABSTRACT

A database query optimizer includes an access plan storage mechanism that stores execution detail corresponding to a query statement in an access plan cache. By storing execution detail in the access plan cache along with the query statement, the execution detail is available when needed to debug database problems, even after a problem occurs. The execution detail stored in the access plan cache may be mined and analyzed after-the-fact, producing a very powerful tool for debugging database problems. Snapshots of the execution detail may also be created by a user. In addition, the user may setup autonomic snapshots and comparisons so that a user may be alerted from a degradation in database performance between two snapshots.

6 Claims, 10 Drawing Sheets

700

Access Plan Cache Statements - Rd1pit  710

List of Statements  720

| Last Time | Most Expensive | Total Time | Total Executions | Statement | User Name | ... |
|---|---|---|---|---|---|---|
| 10/12/06 1:43:32 | 2.0371 | 2.0371 | 1 | SELECT testname ... | QPGMR | |
| 10/12/06 2:16:02 | 1.9820 | 1.9820 | 1 | SELECT testname ... | QPGMR | |
| 10/12/06 2:28:41 | 2.1357 | 2.1357 | 1 | SELECT CURRENT ... | QPGMR | |
| 10/12/06 01:56:09 | 2.1280 | 2.1280 | 1 | INSERT into errfile ... | QPGMR | |
| ... | ... | ... | ... | ... | ... | |
| 10/12/06 3:50:22 | 62.6952 | 125.9273 | 2 | INSERT into errfile... | QPGMR | |

Selected Statement  730
select testname, SQL_ID into :H, :H from KELO3 where sqlstmt in (select sqlstmt from KELO3 where sql_id between 100 and 130 and testname in (select testname from KELO2 where properties is not null) and setup = "S") and sqlstmt like '%CL:DL%' and SQL_ID <> 100 With RR use and keep exclusive locks

Filters for Statement List  740

- [✓] Minimum runtime for the longest execution:
  - 1  Seconds
- [✓] Queries run after this date and time:
  - 10/12/06  1:00 AM
- [ ] Top 'n' most frequently run queries:
- [ ] Top 'n' queries with the largest accumulated runtime
- [ ] Queries currently active
- [ ] Queries run by user: 
- [ ] Queries with index advised
- [ ] Queries that use or reference these objects: 
- [ ] Include queries initiated by the operating system

[ Refresh ] 750
[ Create Snapshot ] 760
[ Show Longest Runs ] 770
[ Run Visual Explain ] 780

FIG. 8

DATABASE EXECUTION DETAIL REPOSITORY

BACKGROUND

1. Technical Field

This disclosure generally relates to the database systems, and more specifically relates to tools for managing database systems.

2. Background Art

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database.

Retrieval of information from a database is typically done using queries. A query usually specifies conditions that apply to one or more columns of the database, and may specify relatively complex logical operations on multiple columns. The database is searched for records that satisfy the query, and those records that satisfy the query are returned as the query result. A popular query language is Structured Query Language (SQL), which has gained widespread acceptance in the database industry.

Debugging performance problems in a database system is often difficult. Database performance monitors have been developed that produce a linear time trace of events in a database system to help debug database problems. However, known database monitors collect so much information that the overhead of collecting the linear time trace of events can significantly affect database performance. As a result, database performance monitors are not turned on until after a problem has been detected. The problem with this approach is that many database problems can be transitory in nature, and attempting to recreate the conditions that lead to the database problem can be difficult or impossible. Without a way to debug database problems that have already occurred from information already gathered by the database system, the known methods of debugging database problems using performance monitors will continue to be a hindrance to effectively debugging database problems.

BRIEF SUMMARY

A database query optimizer includes an access plan storage mechanism that stores execution detail corresponding to a query statement in an access plan cache. By storing execution detail in the access plan cache along with the query statement, the execution detail is available when needed to debug database problems, even after a problem occurs. The execution detail stored in the access plan cache may be mined and analyzed after-the-fact, producing a very powerful tool for debugging database problems. Snapshots of the execution detail may also be created by a user. In addition, the user may setup autonomic snapshots and comparisons so that a user may be alerted from a degradation in database performance between two snapshots.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 8 is a sample display of entries in an access plan cache showing how the GUI controls select and filter the data in the access plan cache;

DETAILED DESCRIPTION

An access plan cache allows storing execution detail corresponding to a query statement with the query statement in the cache. Because the execution detail corresponds to the query statement, the execution detail excludes non-query related information that would normally be collected by a database performance monitor. The database already collects the execution detail, so the storing of the execution detail with its corresponding query statement in the access plan cache may be done with very little impact on system performance. By continuously collecting the execution detail in the access plan cache, a database problem that occurs, even transiently, may be debugged by mining and analyzing the execution detail already stored in the access plan cache. In addition, snapshots may be taken as specified by a user, which includes autonomically taking snapshots and specified times or intervals and autonomically comparing snapshots. If two compared snapshots differ more than a specified threshold, a notification may be sent to the user. In this manner, information that is useful in debugging database problems is autonomically collected by the system so this information may be easily analyzed when a database problem is detected.

Figure 1:
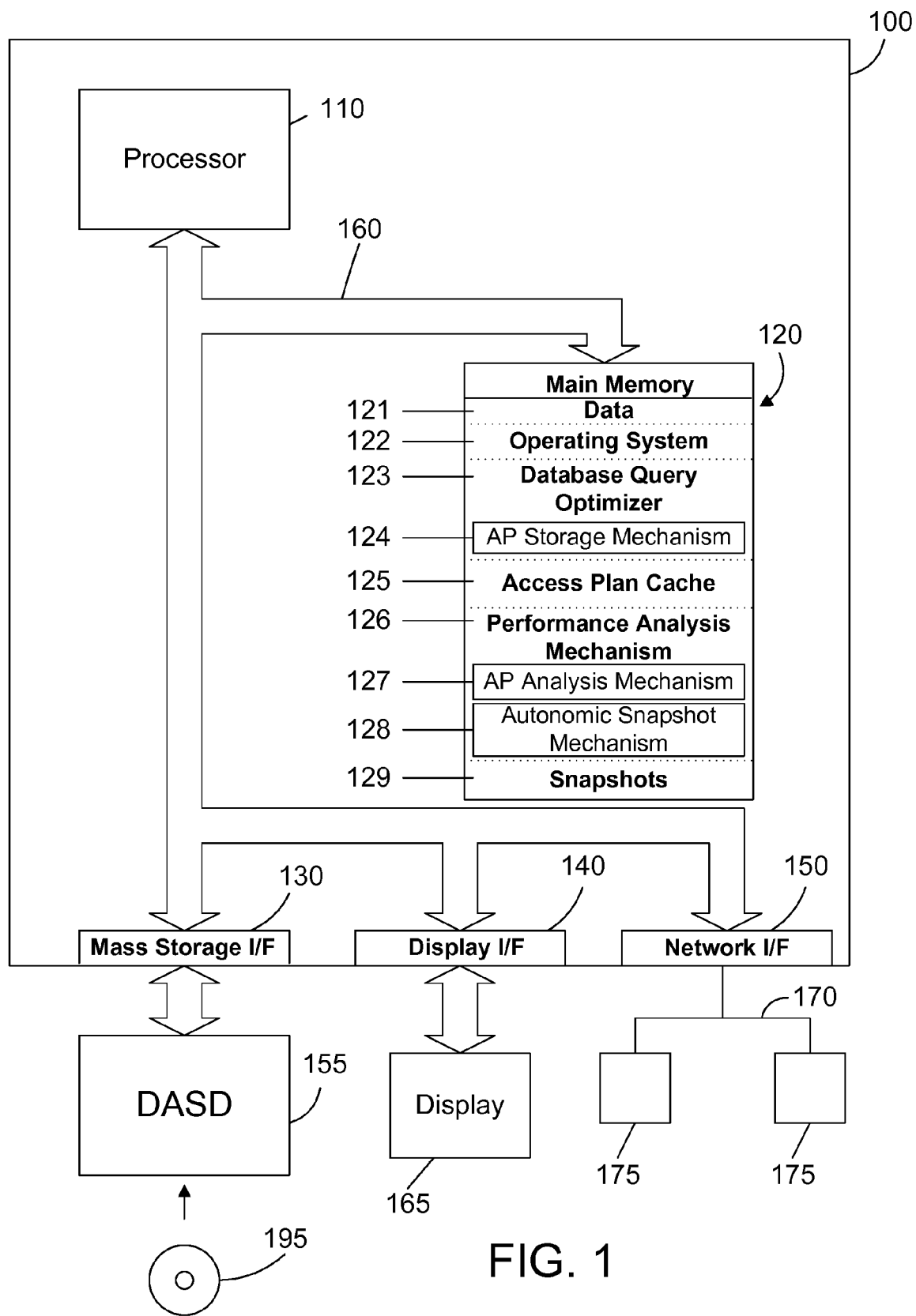
FIG. 1 is a block diagram of an apparatus that includes an access plan cache that includes execution detail, a performance analysis mechanism for analyzing the execution detail, and an autonomic snapshot mechanism for automatically creating and comparing snapshots of the execution detail.

Referring to FIG. 1, a computer system 100 is one suitable implementation of an apparatus that stores execution detail corresponding to queries in an access plan cache, that allows analyzing the execution detail when a database problem is detected, and that allows autonomically collecting and comparing snapshots of the access plan cache, and alerting a user if two snapshots differ by more than some specified threshold. Computer system 100 is an IBM eServer System i computer system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD-RW drive, which may store data to and read data from a CD-RW 195.

Figure 2:
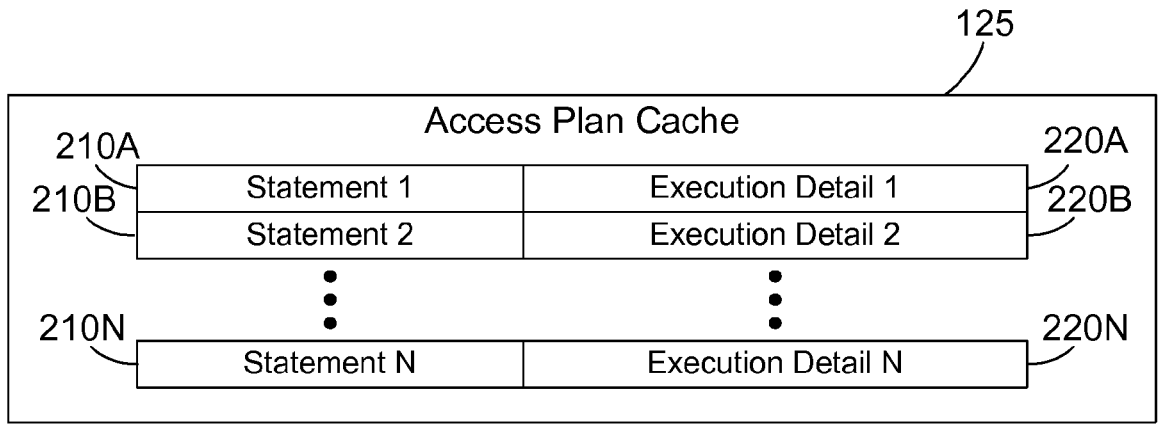
FIG. 2 is a block diagram showing entries in the access plan cache 125 in FIG. 1 that include a query statement and corresponding execution detail.

Main memory 120 preferably contains data 121, an operating system 122, a database query optimizer 123, an access plan cache 125, a performance analysis mechanism 126, and stored snapshots 129. Data 121 represents any data that serves as input to or output from any program in computer system 100. Operating system 122 is a multitasking operating system known in the industry as i5/OS; however, those skilled in the art will appreciate that the spirit and scope of this disclosure is not limited to any one operating system. The database query optimizer 123 includes an access plan storage mechanism 124 that stores entries into the access plan cache 125. The access plan cache 125 preferably includes execution detail in each entry, as shown in FIG. 2 and discussed in more detail below. The access plan storage mechanism 124 stores execution detail already in the possession of the database query optimizer 123 in entries in the access plan cache 125. By storing execution detail in the access plan cache 125 on a continuous basis, the execution detail is available to debug a database problem even after it occurs.

The performance analysis mechanism 126 includes an access plan analysis mechanism 127 that analyzes data stored in the access plan cache 125. The access plan analysis mechanism 127 preferably includes a graphical user interface that displays a subset of the access plan cache entries, and that allows the user to specify criteria for selecting or filtering the data in the access plan cache. The performance analysis mechanism 126 also includes an autonomic snapshot mechanism 128 that allows a user to take snapshots of the access plan cache, to schedule a snapshot in the future, and to schedule periodic snapshots. The autonomic snapshot mechanism 128 may also include a mechanism for autonomically comparing two snapshots for differences, and alerting a user if the differences exceed some defined threshold. The snapshots 129 are a collection of snapshots that may be produced manually be the user or that may be produced autonomically by the autonomic snapshot mechanism 128. Snapshots 129 are preferably in the same format as the output from a database performance monitor so the same tools that are used to display and analyze the output from a database performance monitor may be used to display and analyze the snapshots. The term "snapshot" used herein refers to a persistent representation of some or all of the information in the access plan cache at a given moment in time.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, database query optimizer 123, access plan cache 125, performance analysis mechanism 126, and snapshots 129 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122.

Although computer system 100 is shown to contain only a single processor and a single system bus, those skilled in the art will appreciate that graphical comparison of database items may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. Network interface 150 and network 170 broadly represent any suitable way to interconnect computer systems, regardless of whether the network 170 comprises present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the description above is in the context of a fully functional computer system, those skilled in the art will appreciate that the inbound packet filter mechanism may be distributed as a program product in a variety of forms, and that the claims extend to all suitable types of computer-readable media used to actually carry out the distribution. Examples of suitable computer-readable media include: recordable media such as floppy disks and CD-RW (e.g., 195 of FIG. 1), and transmission media such as digital and analog communications links.

Embodiments herein may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Referring to FIG. 2, one suitable implementation of an access plan cache 125 shown in FIG. 1 is shown. The access plan cache 125 includes a plurality of entries that each include a query statement and corresponding execution detail. Thus, the first entry shown in FIG. 2 includes a first query statement 210A and corresponding execution detail 220A; the second entry includes a second query statement 210B and corresponding execution detail 220B; and so on until the Nth entry includes a query statement 210N and corresponding execution detail 220N.

Figure 3:
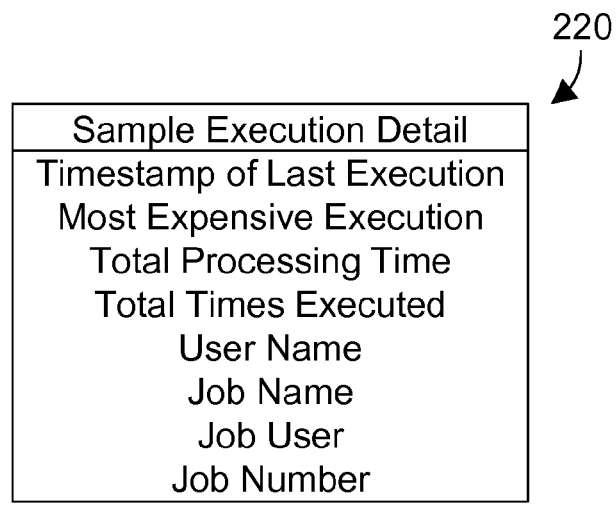
FIG. 3 is a block diagram showing sample execution detail that could be stored in the access plan cache in FIGS. 1 and 2.

Sample execution detail 220 is shown in FIG. 3. Note that the execution detail relates to the corresponding query statement (see FIG. 2). Thus, the execution detail in the access plan cache 125 may be thought of a "query-centric" because it relates to the corresponding query statement. Suitable examples of sample execution detail include the timestamp of the last execution of the corresponding query statement, the most expensive execution time of the corresponding query statement, the total processing time for the corresponding query statement, the total number of times the corresponding query statement was executed, the user name that executed the corresponding query statement, the job name that executed the corresponding query statement, the job user that executed the corresponding query statement, and the job number that executed the corresponding query statement. These examples of execution detail shown in FIG. 3 are data a query optimizer typically has access to, so storing this data as execution detail in an entry in an access plan cache can be done with little additional overhead. Note, however, that other execution detail not shown in FIG. 3 may also be stored in entries in the access plan cache 125. The disclosure and claims herein expressly extend to any suitable execution detail that relates to the execution of the query statement that may be stored with the corresponding query statement in the access plan cache 125.

Figure 4:
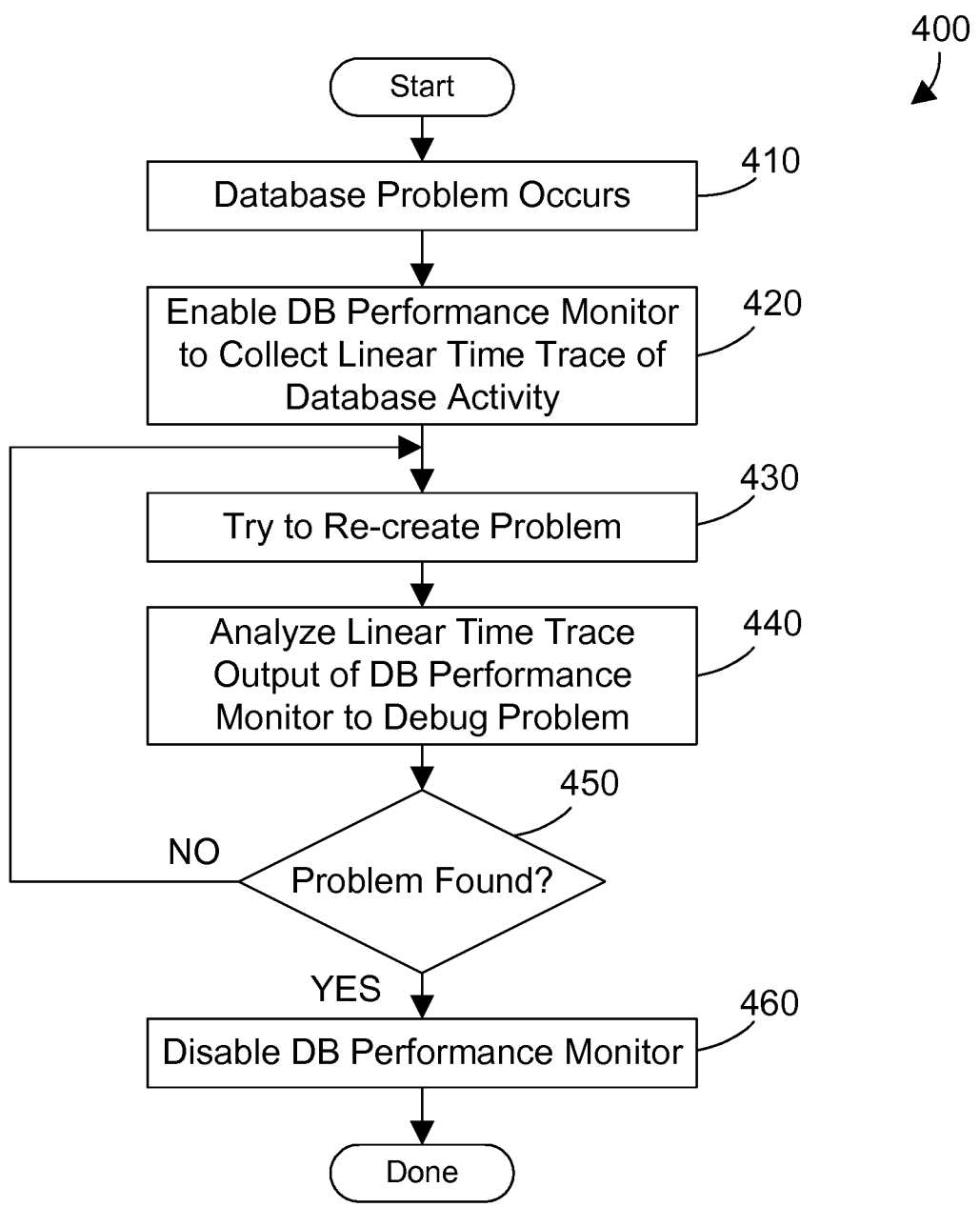
FIG. 4 is a flow diagram of a prior art method for debugging a database problem.

Referring to FIG. 4, a prior art method 400 shows steps that have been typically performed to debug a database problem. As discussed in the Background Art section above, known database performance monitors typically collect so much information that they cause a significant performance impact when they run. In addition, the volume of information collected by known database performance monitors is so high that they are only enabled when trying to track down a problem. Method 400 begins when a database problem occurs (step 410). A prior art database performance monitor can be enabled to collect a linear time trace of database activity (step 420). The user (or database administrator) that is trying to debug the database problem will then attempt to recreate the problem (step 430). Recreating a database problem may be difficult, because conditions that lead to the problem may be very difficult to replicate. The linear time trace output of the database performance monitor may then be analyzed to debug the database problem (step 440). If the problem was found (step 450=YES), the database performance monitor is disabled (step 460), and method 400 is done. If the problem was not found (step 450=NO), method 400 loops back to step 430 and continues.

One of the big problems with prior art method 400 is attempting to recreate the problem while the database performance monitor is running. Many database problems are transient in nature, and recreating the conditions that produced the problem is very difficult, indeed. The disclosure herein shows a way to continuously collect query-centric execution detail in an access plan cache so the execution detail may be mined and analyzed after a database problem occurs to determine the cause of the database problem.

Referring back to FIG. 1, the access plan storage mechanism 124 preferably stores execution detail with each entry it writes to the access plan cache 125. As a result, each entry in the access plan cache 125 includes a query statement and corresponding execution detail, as shown in FIG. 2. With this execution detail being continuously stored in the access plan cache 125 in a query-centric manner, a database problem may now be debugged by analyzing the execution detail in the access plan cache after the database problem occurs.

Figure 5:
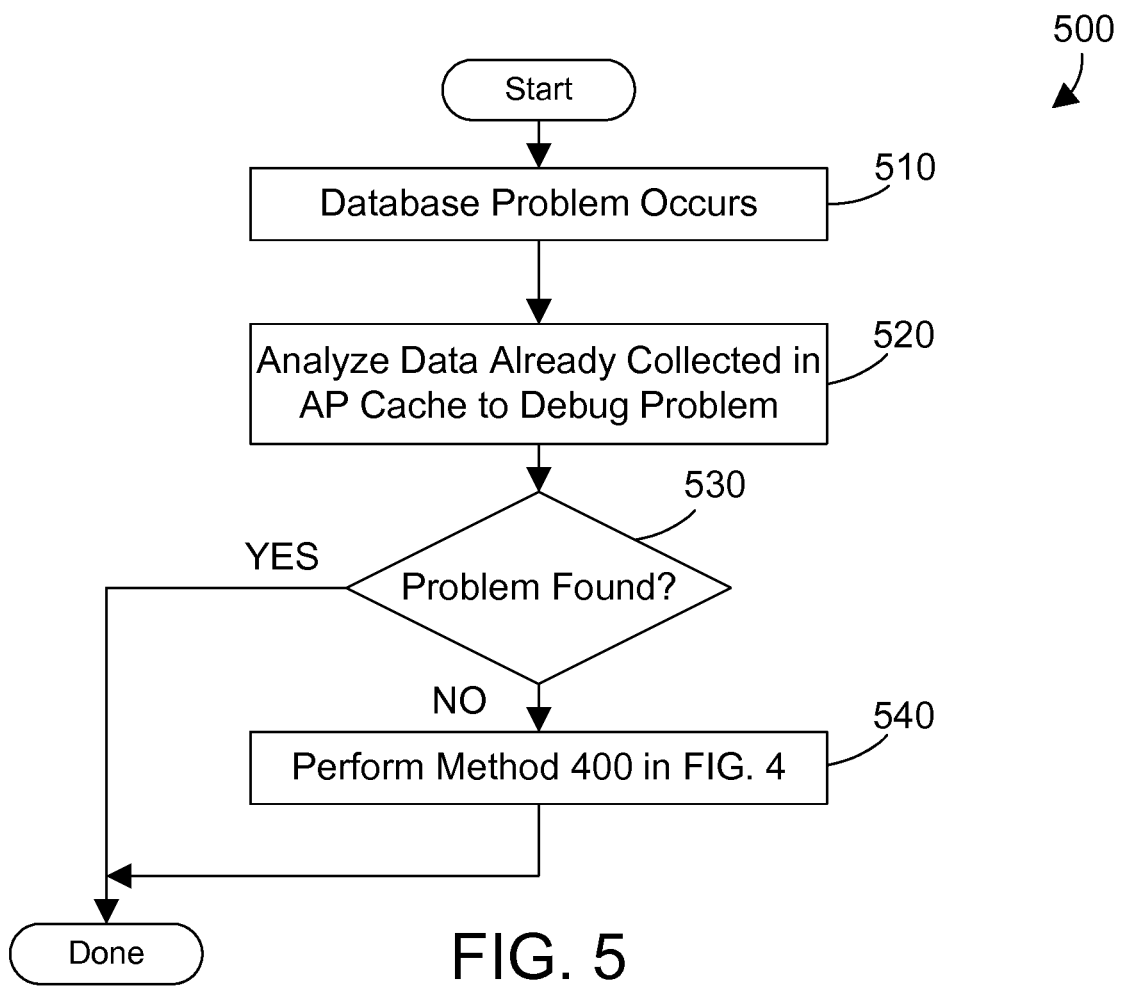
FIG. 5 is a flow diagram of a method for debugging a database problem by analyzing execution detail stored in the access plan cache.

Referring to FIG. 5, a method 500 for debugging a database problem using execution detail stored in the access plan cache begins when a database problem occurs (step 510). The data already collected in the access plan cache may then be retrieved and analyzed (step 520). If the problem was found (step 530=YES), method 500 is done. If the analysis of the execution detail in step 520 did not identify the database problem (step 530=NO), other debugging steps may be taken, such as executing prior art method 400 in FIG. 4 to use a database performance monitor to try to identify the problem.

One of the interesting differences between continuously collecting query-centric execution detail in an access plan cache as shown in FIG. 5 and collecting a linear time trace of all database events in a database performance monitor in FIG. 4 is the query-centric execution detail is already known by the database manager, and thus can be stored with the query statement in the access plan cache with little additional overhead. This allows the execution detail to be continuously collected and saved in the access plan cache. This is a significant contrast to a database performance monitor, which is not query-centric and which collects a large amount of data in a linear time trace of events in a database.

Figure 6:
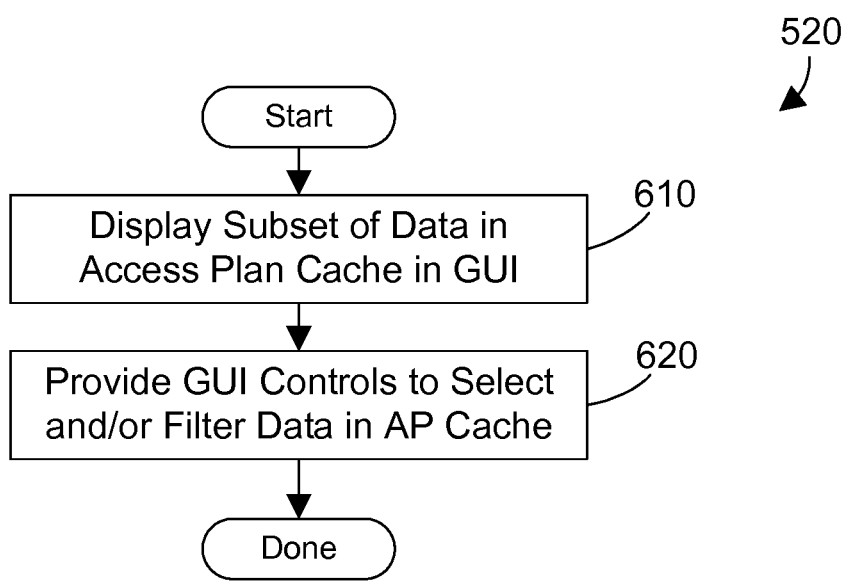
FIG. 6 is a flow diagram of a method for displaying a subset of data in the execution plan cache and for providing GUI controls for selecting and filtering the data.

Referring to FIG. 6, one suitable implementation for step 520 is shown. A subset of the data in the access plan cache is displayed to the user in a graphical user interface (step 610). The graphical user interface includes controls to select and/or filter data in the access plan cache (step 620). These controls allow the user to perform data mining and analysis on the entries stored in the access plan cache. The result is a graphical user-friendly way to debug a database problem by viewing and analyzing entries in the access plan cache that include execution detail for a corresponding query statement.

Figure 7:
FIG. 7 is a sample display of entries in an access plan cache that include execution detail, along with GUI controls for selecting and filtering the data.

Referring to FIG. 7, a display 700 is shown as one suitable implementation of a GUI display for entries in the access plan cache. Display 700 includes a title bar 710, a window 720 for displaying entries in the access plan cache, a window 730 for showing the full query statement that is selected in window 720, and a window 740 that provides GUI controls that allow a user to select and/or filter the information in the access plan cache. Note that the access plan cache entries shown in window 720 in FIG. 7 include a query statement, and additionally include execution detail comprising the last time the query statement was executed, the most expensive execution of the query statement, the total time for executing the query statement, the total executions of the query statement, and the user name that executed the query statement. Note there is a " . . . " to the right of the column headings in the window 720 that represents that other suitable execution detail may also be included in each entry in the access plan cache.

Window 730 displays the full query statement for a selected entry in the access plan cache. The third entry is highlighted in window 720. We assume the full query statement for this entry is shown in window 730, allowing a user to examine the query statement. Because it is helpful to view much of the execution detail in window 720, there may not be enough room to display the full query statement. Thus, the full query statement may be displayed in window 730.

Most access plan caches will have many entries that cannot all be displayed in window 720 at the same time. For this reason, a subset of the entries is typically displayed. A scroll bar could be provided to scroll through the list of entries, as is known in the GUI art. In addition, the displayed entries may also be filtered according to criteria specified in the GUI controls in window 740.

Window 740 shows many GUI controls that could be used to select and filter the entries in the access plan cache. The GUI controls shown in FIG. 7 include multiple checkboxes, along with data fields that may include drop-down lists of possible selections. The first checkbox in window 740 allows a user to specify a minimum runtime for the longest execution. By doing this, only those entries in the access plan cache that have a most expensive execution time greater than the user-specified minimum runtime will be displayed in window 720. The second checkbox in window 740 allows a user to specify that only queries that run after a specified date and time will be included. Other checkboxes in window 740 allow a user to specify to look at the top "n" most frequently run queries, or the top "n" queries with the largest accumulated runtime, where "n" is entered by the user. The user may also specify that only the currently active queries are displayed in window 720, or that only queries run by a specified user are included in window 720. The user may specify that only queries with an index advised are included in window 720. The user may also specify one or more objects that a query must use or reference to be included in window 720. The user may also specify to include queries initiated by the operating system. Other GUI controls not shown in FIG. 1 could also be provided within the scope of the disclosure and claims herein.

The window 740 also includes buttons 750, 760, 770 and 780 that allow the user to perform various functions. By clicking on the refresh button 750, the view in window 720 is refreshed according to the currently-selected GUI controls, such as the checkboxes on the left side of window 740. Clicking on the create snapshot button 760 invokes a different display that allows the user to define when a snapshot is to be created. A snapshot is a persistent representation of some or all of the information in the access plan cache at a particular point in time. Because the information in the access plan cache changes over time, taking snapshots is a way to document the contents of the access plan cache at different points in time, which allows for comparing the snapshots to determine how the performance increased or decreased between two snapshots. Clicking on the show longest runs button 770 causes the longest executions of the currently-selected query statement in window 720 to be shown. Clicking on the run visual explain button 780 invokes a different tool called Visual Explain that provides a visual representation of the selected query statement, thereby providing to the user another tool for debugging the problem.

Referring now to FIG. 8, display 700 includes GUI controls that have been checked in window 740. The user has specified in window 740 in FIG. 8 a minimum runtime of 1 second, and queries that were run after a specified date and time. The results are shown in window 720. Another powerful GUI control is the "Queries currently active" checkbox that allows the user to specify that only the currently active queries are shown in window 720.

Figure 9:
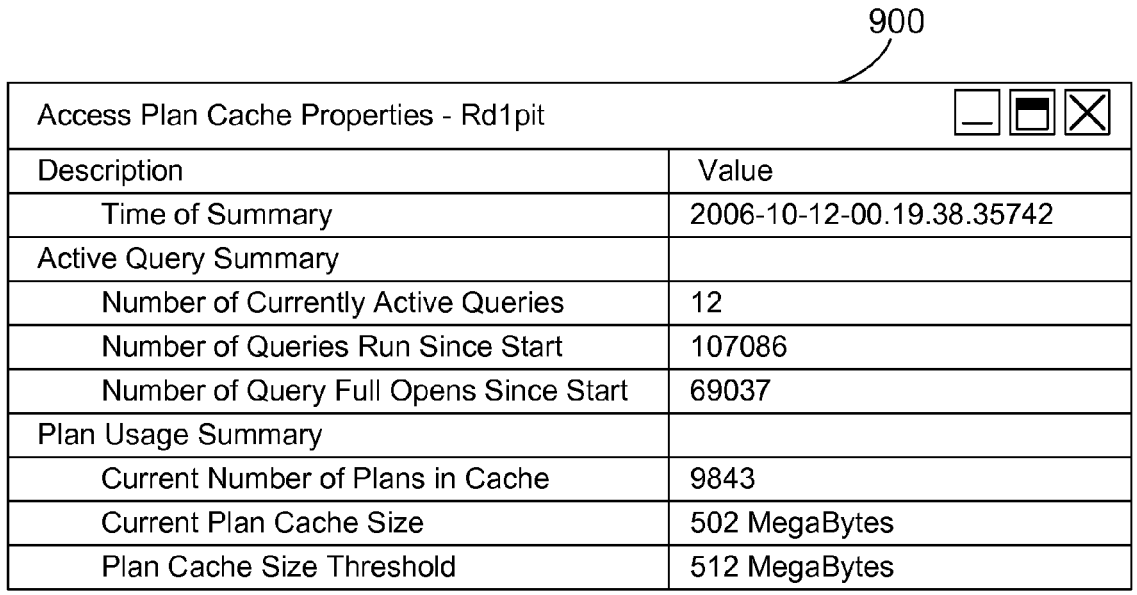
FIG. 9 is a sample display of properties of the access plan cache.

Referring to FIG. 9, a display shows properties of the access plan cache 125 shown in FIGS. 1 and 2. This is a summary of information stored in the access plan cache, and may include the time of the summary, the number of currently active queries, the number of queries run since the start, the number of query full opens since the start, the current number of plans in the cache, the current plan cache size, and the current plan cache size threshold. Of course, other suitable plan cache properties could also be included. In the specific example in FIG. 9, the current plan cache size is 502 MB and the plan cache size threshold is 512 MB. Once the current plan cache size reaches the plan cache size threshold of 512 MB, some of the entries in the access plan cache will be replaced by new entries using known schemes for replacing entries in caches, such as least recently used, etc. Because the access plan cache dynamically changes, it is often desirable to take a snapshot of the access plan cache at a particular point in time so the state of the access plan cache can be persisted. This allows snapshots to be compared to determine how performance has changed between two snapshots.

Figure 10:
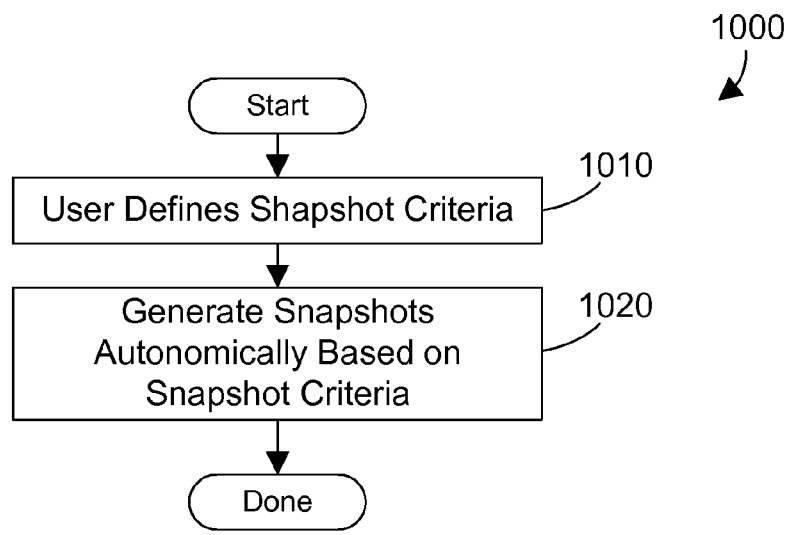
FIG. 10 is a flow diagram of a method for autonomically generating snapshots of the access plan cache based on user-defined snapshot criteria.

FIG. 10 shows a method 1000 for the autonomic snapshot mechanism 128 in FIG. 1 to autonomically generate one or more snapshots 129. First, a user defines snapshot criteria (step 1010). The autonomic snapshot mechanism 128 then autonomically generates one or more snapshots based on the user-defined snapshot criteria (step 1020). The ability to autonomically create snapshots is a significant advantage over the prior art. Database users and administrators typically have enough to do without worrying about periodically documenting the state of the database. By defining a snapshot criteria that causes autonomic creation of periodic snapshots, a library of snapshots will be available at any given time that will allow a user to analyze how the database performance has changed over time.

Figure 11:
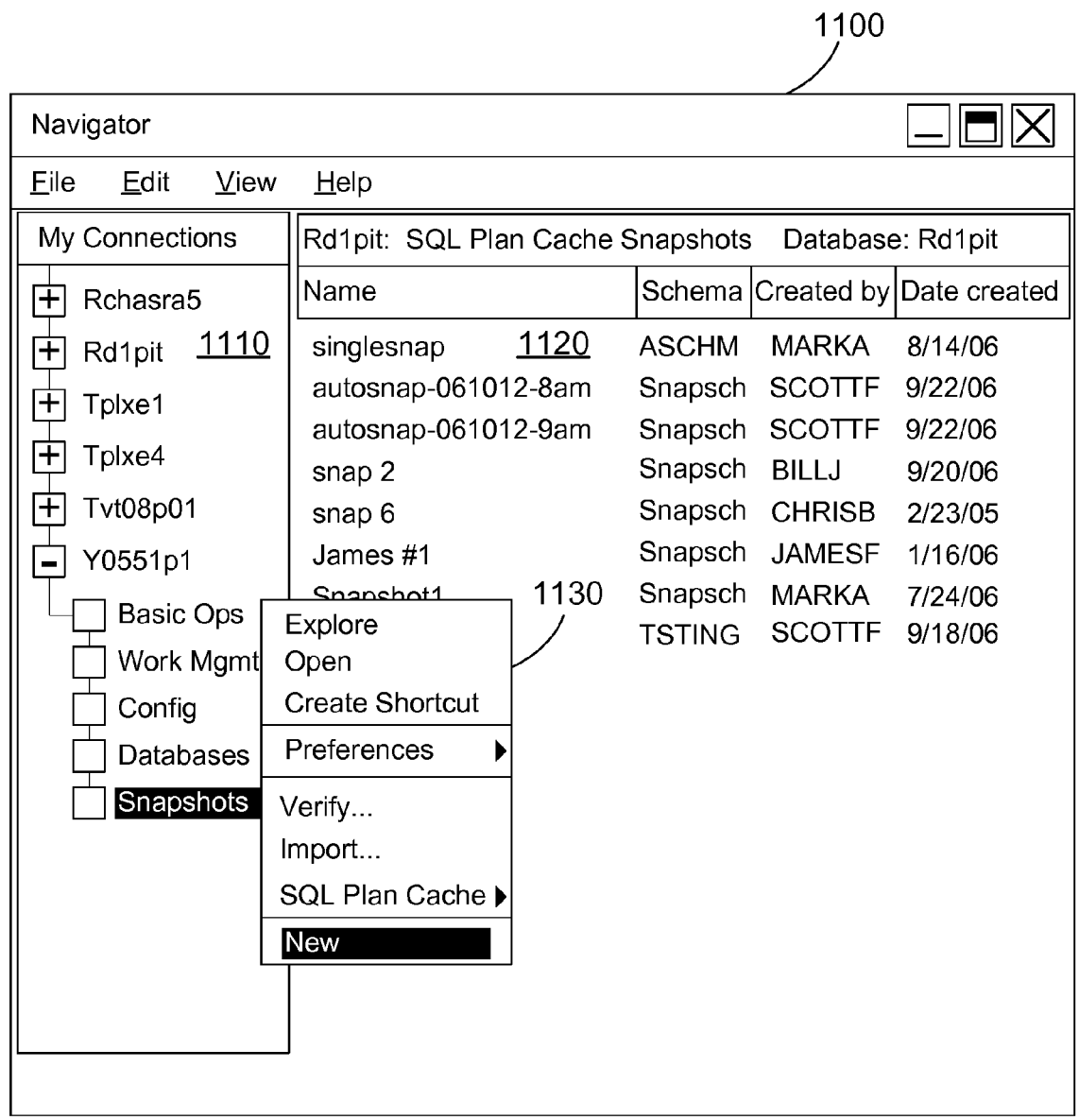
FIG. 11 is a sample display showing how a user can create a new snapshot of the access plan cache.
Figure 12:
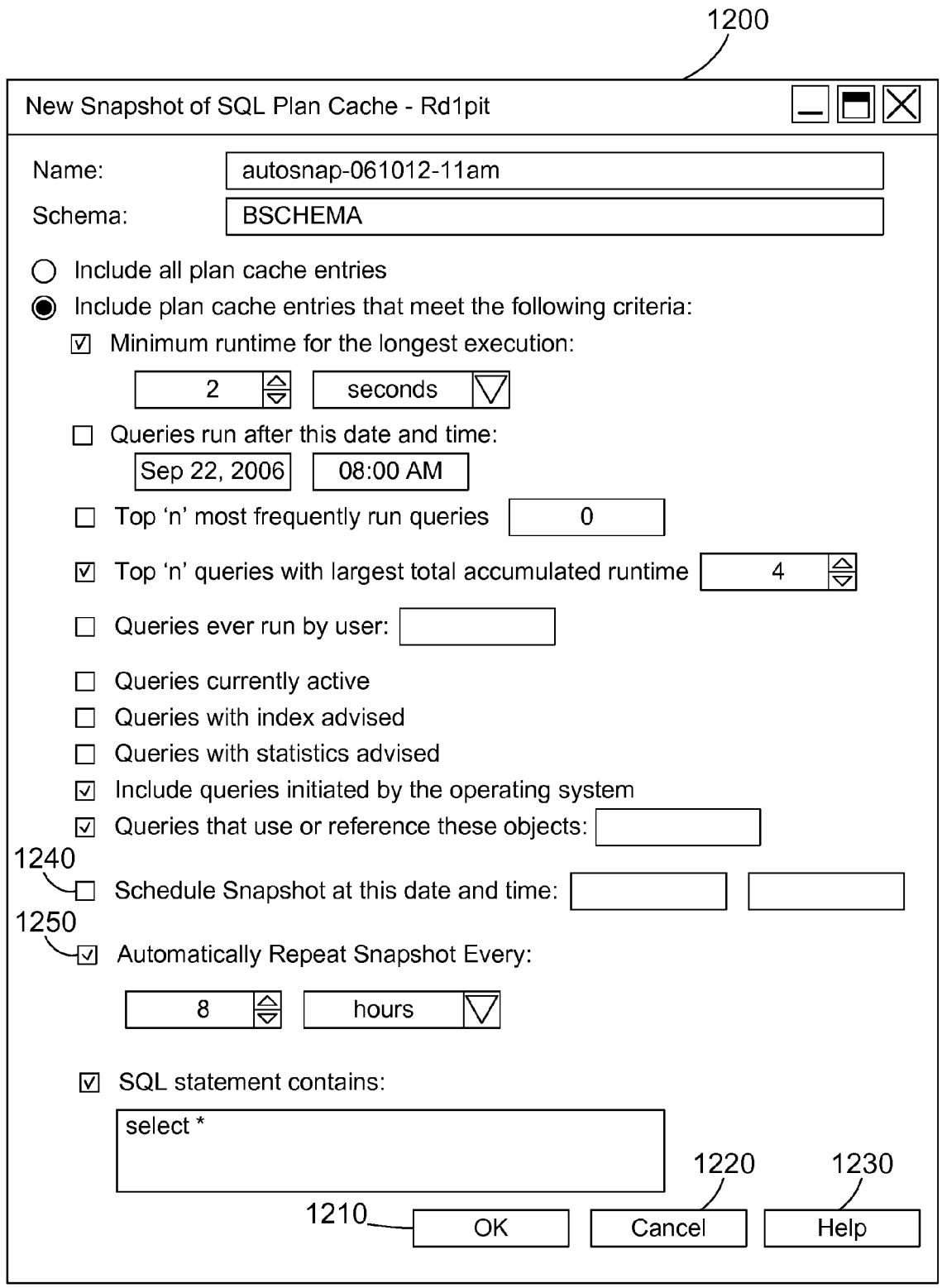
FIG. 12 is a sample display that allows defining a plan cache snapshot.

Referring to FIG. 11, a sample display window 1100 includes a directory called "Snapshots" that contains one or more snapshots, which are persistent representations of some or all of the data in the access plan cache. The window 1100 includes a directory window 1110 and a directory contents window 1120. A user may right-click on the Snapshots directory in the directory window 1110, as shown by the highlighting of Snapshots in window 1110. This causes a menu window 1130 to open with various selections, one of which is New. When the user selects New in menu window 1130, a display window 1200 in FIG. 12 is preferably displayed that allows the user to define criteria for the creation of the snapshot. Note the user may enter the name and schema of the snapshot, and may enter criteria that must be satisfied for the snapshot. By entering criteria, the snapshot is effectively a persistent subset of relevant data stored in the access plan cache at the time the snapshot is taken. Note that the snapshot may be created once by the user simply defining the desired criteria and clicking on the OK button 1210. In the alternative, the snapshot may be scheduled to occur once at a designated time in the future, as indicated by checkbox 1240. The snapshot may also be scheduled to occur periodically by checking checkbox 1250 and specifying the period between snapshots. For the example in FIG. 12, a snapshot will be created once when the user clicks OK, and will be autonomically repeated every eight hours. The result will be three snapshots per day. When a database problem is encountered, the analyst investigating the problem can go back through the library of snapshots to determine how the performance changed over time. Note that Cancel button 1220 may be clicked to close window 1200 without creating a snapshot, and Help button 1230 may be clicked to provide context-sensitive help to the user.

Figure 13:
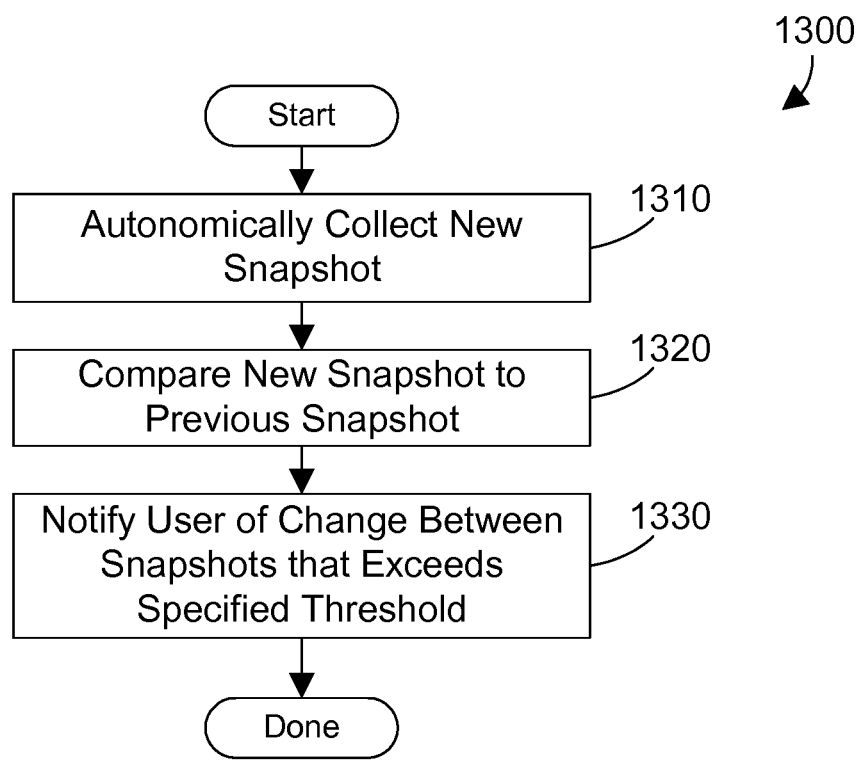
FIG. 13 is a flow diagram of a method for autonomically collecting and comparing snapshots and notifying a user of a change that exceeds a specified threshold.

Another significant feature of the autonomic snapshot mechanism 128 in FIG. 1 is the ability to autonomically compare snapshots, and to alert a user if the change between snapshots is excessive. Referring to FIG. 13, a method 1300 starts by autonomically collecting a new snapshot (step 1310). The new snapshot is then compared to a previous snapshot (step 1320). Note that the previous snapshot can be the most recent snapshot, or can be some reference snapshot that is used as a baseline measurement of system performance. This allows notifying the user on the magnitude of change between the reference and the current snapshot, or notifying the user if the delta between snapshots exceeds some specified threshold. If the change between the snapshots exceeds some specified threshold, the user is notified (step 1330). The threshold can be defined in any suitable way, and is not necessarily a static number. Indeed, the threshold could be defined to be a function of the interval between the snapshots being compared. The threshold can also be defined as a difference between two selected parameters in the snapshots, or may be a composite specification of two or more selected parameters with respective thresholds. Any suitable heuristic could be used to determine when to notify a user based on several separate parameters and thresholds. Step 1330 in FIG. 13 broadly represents that a user may be notified of any change of any specified magnitude between snapshots.

Storing execution detail in an access plan cache with a corresponding query statement results in a store of information that is continuously collected without significantly affecting database performance. This store of information may be mined and analyzed after a database problem occurs, which provides data that correlates to the time the problem occurred. The result is a significant improvement in debugging database problems. In addition, the scheduling of autonomic snapshots of the access plan cache persists the execution detail in a way that is easily analyzed at a later time. The autonomic comparison of snapshots further provides a way for a user to be notified when two snapshots differ by some threshold amount. The result is much easier debugging of database problems, because the information needed to debug most database problems is already resident in the access plan cache.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

What is claimed is:

1. An apparatus comprising:
   at least one processor;
   a memory coupled to the at least one processor;
   an access plan cache residing in the memory that includes
      a plurality of entries that each comprises a query statement and corresponding execution detail for the query statement that includes data collected from a plurality of previous executions of the query, wherein the execution detail for a corresponding query statement includes:
      timestamp of last execution of the query statement;
      most expensive execution of the query statement;
      total processing time of the query statement;
      total number of times the query statement was executed;
      user name that executed the query statement;
      job name that executed the query statement;
      job user that executed the query statement; and
      job number that executed the query statement;
   an access plan storage mechanism that stores the plurality of entries in the access plan cache;
   a performance analysis mechanism that analyzes the plurality of entries in the access plan cache and provides a graphical user interface that allows a user to select and filter the execution detail stored in the access plan cache for display in the graphical user interface; and
   an autonomic snapshot mechanism that autonomically takes periodic snapshots of the access plan cache at time intervals specified in a user-defined snapshot criteria, wherein the autonomic snapshot mechanism autonomically compares two snapshots and notifies a user if a change between the two snapshots exceeds a specified threshold.

2. A method for debugging a database problem in a database, the method comprising the steps of:
   during normal operation of the database, storing in an access plan cache a plurality of entries, each entry comprising a query statement and corresponding execution detail for the query statement that includes data collected from a plurality of previous executions of the query, wherein the execution detail for a corresponding query statement includes:
      timestamp of last execution of the query statement;
      most expensive execution of the query statement;
      total processing time of the query statement;
      total number of times the query statement was executed;
      user name that executed the query statement;
      job name that executed the query statement;
      job user that executed the query statement; and
      job number that executed the query statement;
   autonomically taking periodic snapshots of the access plan cache at time intervals specified in a user-defined snapshot criteria;
   after the database problem occurs, analyzing the execution detail in the access plan cache to determine at least one cause of the database problem;
   when at least one cause of the problem cannot be determined by analyzing the execution detail in the access plan cache, performing the steps of:
      enabling a database performance monitor to create a linear time trace of events in the database system; and
      attempting to recreate the problem while the database performance monitor is enabled.

3. The method of claim 2 wherein the step of analyzing the execution detail comprises the step of graphically displaying the execution detail to a user in a graphical user interface and providing a plurality of controls in the graphical user interface that allow the user to select and filter the execution detail for display in the graphical user interface.

4. The method of claim 2 further comprising the steps of:
   autonomically comparing two snapshots; and
   notifying a user if a change between the two snapshots exceeds a specified threshold.

5. A method for deploying computing infrastructure, comprising integrating computer readable code into a computing system, wherein the code in combination with the computing system perform the method of claim 2.

6. A computer-readable program product comprising:
   a performance analysis mechanism that analyzes a plurality of entries in an access plan cache, each entry comprising a query statement and corresponding execution detail for the query statement that includes data collected from a plurality of previous executions of the query, wherein the execution detail for a corresponding query statement includes:
      timestamp of last execution of the query statement;
      most expensive execution of the query statement;
      total processing time of the query statement;

total number of times the query statement was executed;
user name that executed the query statement;
job name that executed the query statement;
job user that executed the query statement; and
job number that executed the query statement;
the performance analysis mechanism providing a graphical user interface that allows a user to select and filter the execution detail stored in the access plan cache for display in the graphical user interface;
an access plan storage mechanism that stores the plurality of entries in the access plan cache;
an autonomic snapshot mechanism that autonomically takes periodic snapshots of the access plan cache at time intervals specified in a user-defined snapshot criteria, wherein the autonomic snapshot mechanism autonomically compares two snapshots and notifies a user if a change between the two snapshots exceeds a specified threshold; and
non-transitory recordable media bearing the performance analysis mechanism, the access plan storage mechanism and the autonomic snapshot mechanism.

\* \* \* \* \*